US011909183B2

(12) United States Patent
Oscar et al.

(10) Patent No.: US 11,909,183 B2
(45) Date of Patent: Feb. 20, 2024

(54) ROLLER UNIT FOR LAYING CABLES IN A PLANT FOR LAYING CABLES AND PLANT FOR LAYING CABLES COMPRISING THE ROLLER UNIT

(71) Applicant: TESMEC S.P.A., Milan (IT)

(72) Inventors: Alberto Oscar, Castro (IT); Stefano Osio, Treviolo (IT)

(73) Assignee: TESMEC S.P.A. (IT)

( * ) Notice: Subject to any disclaimer, the term of this patent is extended or adjusted under 35 U.S.C. 154(b) by 625 days.

(21) Appl. No.: 16/973,851

(22) PCT Filed: Jun. 20, 2019

(86) PCT No.: PCT/IT2019/050148
§ 371 (c)(1),
(2) Date: Dec. 10, 2020

(87) PCT Pub. No.: WO2019/244190
PCT Pub. Date: Dec. 26, 2019

(65) Prior Publication Data
US 2021/0175693 A1 Jun. 10, 2021

(30) Foreign Application Priority Data
Jun. 20, 2018 (IT) .......................... 102018000006501

(51) Int. Cl.
*H02G 1/04* (2006.01)
(52) U.S. Cl.
CPC .................................... *H02G 1/04* (2013.01)
(58) Field of Classification Search
CPC .. H02G 1/04; H02G 7/00; H02G 7/02; H02G 7/04; H02G 7/05; H02G 7/20
See application file for complete search history.

(56) References Cited

U.S. PATENT DOCUMENTS 3,853,304 A * 12/1974 Jackson ................... H02G 1/04
174/41
3,863,897 A * 2/1975 Yeager ..................... H02G 1/04
254/134.3 R
(Continued)

FOREIGN PATENT DOCUMENTS

AT 292826 B * 12/1968
AT 292826 9/1971
(Continued)

*Primary Examiner* — Tyrone V Hall, Jr.
(74) *Attorney, Agent, or Firm* — BakerHostetler

(57) ABSTRACT

Roller unit for laying cables (11, 12, 13) that comprises a frame (23, 23') where at least one pair of sliders (25, 25') are positioned aligned parallel to a laying direction (S1, S2) of the cables (11, 12, 13) and each provided with at least one pair of wheels (28, 28a, 28b) to support a cable (11, 12, 13) to be laid; the sliders (25, 25') are hinged to the frame (23, 25') and rotatable around respective axes of rotation (A, A') in order to vary the inclination thereof with respect to the frame (23, 23') and therefore to vary the radius of curvature (R, R1, R2, R3) of the supported cable (11, 12, 13); at least one of the sliders (25, 25') comprises an oscillation limiting tooth (30, 30') provided in at least one portion (32, 32') of the slider (25, 25') protruding from the frame (23, 23') and configured to abut against a lateral wall (31, 31) of the frame (23, 23') when the slider (25, 25'), rotating around the respective axis of rotation (A, A'), exceeds a certain inclination, so as to prevent an excessive reduction of the radius of curvature (R, R1, R2, R3) of the cable (11, 12, 13) supported by the slider (25, 25').

9 Claims, 4 Drawing Sheets

(56) References Cited

U.S. PATENT DOCUMENTS 4,201,369 A * 5/1980 Betta ..................... H02G 1/04
  242/157 R
5,221,074 A * 6/1993 Saracini ................. H02G 1/04
  254/134.3 PA

FOREIGN PATENT DOCUMENTS

| CN | 101582571 | 11/2009 | | |
| EP | 1231097 A1 * | 8/2002 | .............. | B60M 1/28 |
| EP | 1231097 A1 | 8/2002 | | |

* cited by examiner

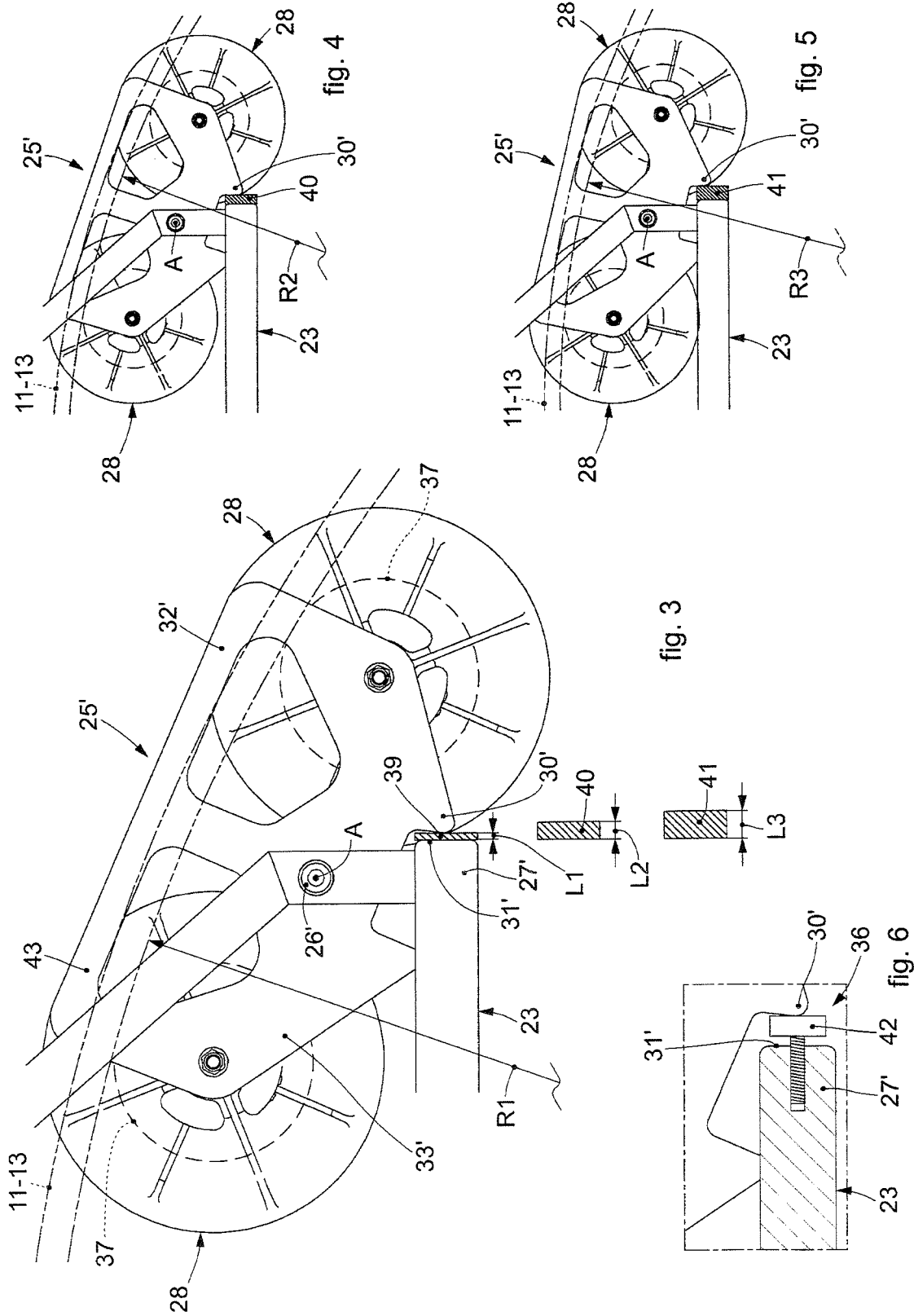

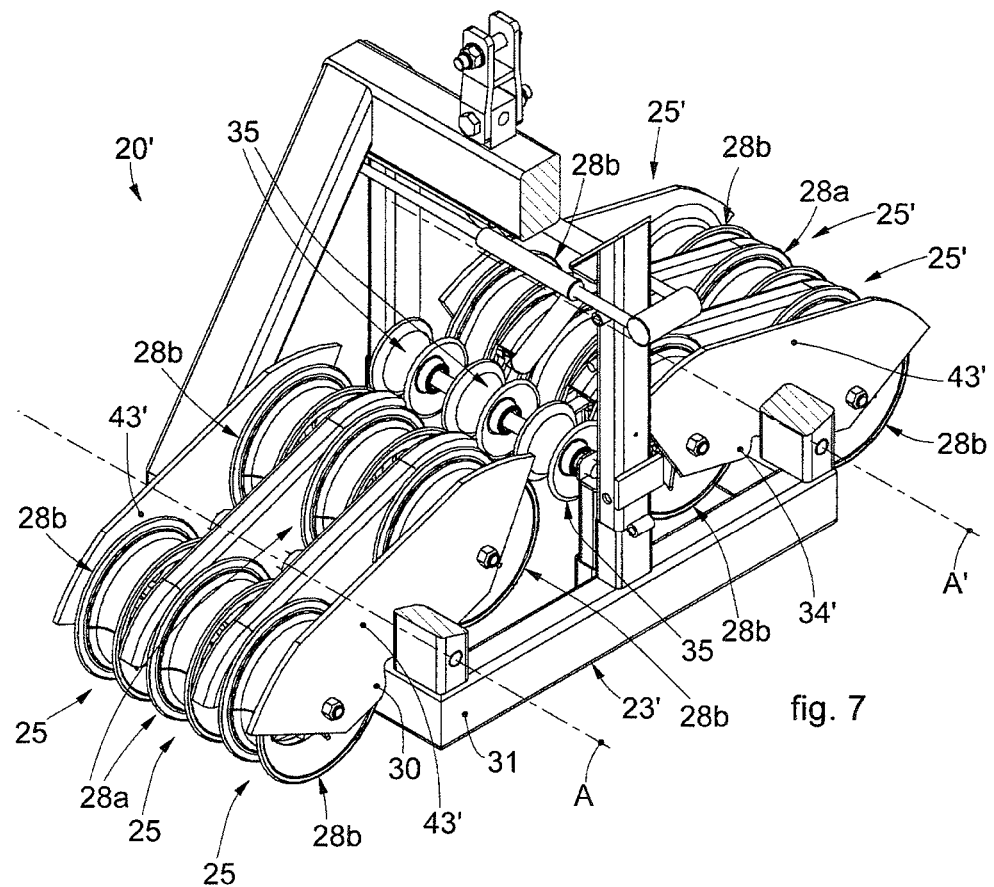
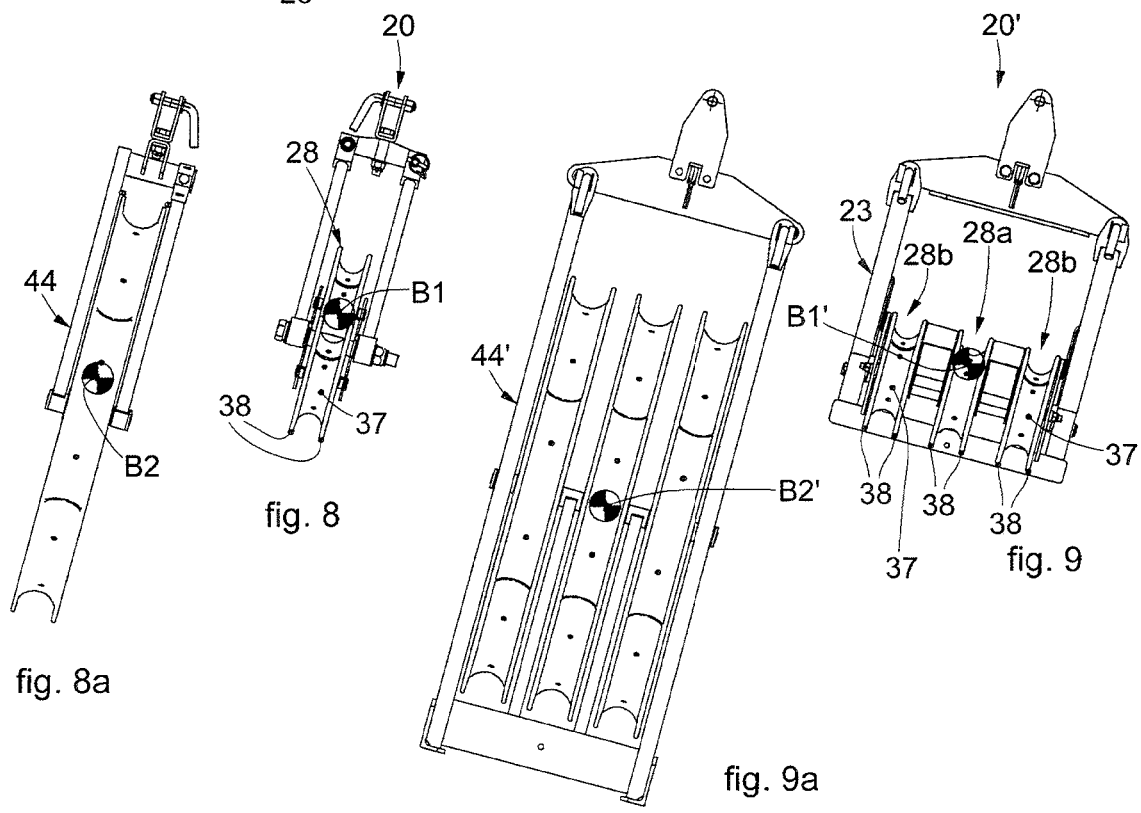
fig. 7
fig. 8  fig. 8a  fig. 9  fig. 9a

ROLLER UNIT FOR LAYING CABLES IN A PLANT FOR LAYING CABLES AND PLANT FOR LAYING CABLES COMPRISING THE ROLLER UNIT

CROSS-REFERENCE TO RELATED APPLICATIONS

This application is the National Stage of International Patent Application No. PCT/IT2019/050148, filed Jun. 20, 2019, which claims priority to Italian Application No. 102018000006501, filed Jun. 20, 2018, the disclosures of which are incorporated herein by reference in their entirety.

FIELD OF THE INVENTION

The present invention concerns a roller unit for laying cables, such as for example electrical conductors, ropes, optical fibers, or suchlike, or for replacing them, in a plant for laying cables, and also concerns a plant for laying cables comprising the roller unit.

In particular, the present invention concerns a roller unit usable in a plant for laying, for example, a high voltage overhead electric line and in general overhead lines which provide the so-called "braked" laying of the cables.

BACKGROUND OF THE INVENTION

It is known that the laying of cables of overhead electric lines, data distribution lines, or others, is performed with plants that achieve the principle of "braked stretching", where one or more winch machines recover one or more cables or old conductors to be replaced and one or more "braking" machines perform the braking of the new conductors in the process of being laid to guarantee a geometric configuration in the span that avoids interferences with natural and/or artificial obstacles. These plants therefore perform the controlled laying and stretching of the cables.

In particular, the laying plants above provide a machine with a winch function configured to recover a cable, or a steel cable, with a towing function, by winding the latter onto a respective pair of traction drums or capstans. The laying plants above comprise, on the other end of the line to be laid, a machine with a brake function configured to control the unwinding tension of the cable or cables to be laid by winding it onto the respective pair of unwinding capstans where the cable is drawn, for example, by the action of the winch machine.

In particular, the braking machine exerts a controlled tension on the cables in the process of being laid to guarantee that they can remain suspended on suitable guide devices provided on intermediate supports and are disposed according to the configuration of the suspended catenary with controlled inflection. In this way, the cables do not slide on the ground and remain distant from possible obstacles present under the cables themselves, such as for example road or rail crossings, intersection of other electric lines, etc.

To lay the cables, pilot towing cables, or the same electric cables to be replaced that are already present on the lines, are normally used.

The laying machines comprise two or more combined pairs of capstans, on which the cables are wound: if the cable is pulled the stretcher is used as a winch, while if the cable is braked by the action of the capstan itself, the stretcher is used as a brake to regulate the correct tension of the cable during the stretching.

The suitable guide devices provided on intermediate supports, for example pylons, are typically represented by supports consisting of a series of pulleys, all rotating idly around a common axis, and on which initially the towing cables and subsequently the conductors slide. When the conductor cables have reached the required tension, they are removed from the groove of the corresponding support pulley and clamped in the definitive position.

The minimum diameter of the pulleys is set by the regulations in force as a function of the diameter of the conductor, typically 20 times the diameter of the conductor, and therefore the sizes of the pulleys can reach considerable sizes. In fact, the regulations aim to avoid the use of pulleys of reduced diameter, which would favor stretching operations, but which would damage the conductor due to the inflection that generates high surface pressure between the grooves of the pulley and the cable itself. In practice, the choice of pulley is made by balancing the need for practicality with the need not to ruin the cable already during mounting.

In more recent times, in order to avoid the flattening stresses of the conductor concentrating on the grooves of the pulleys, as well as to avoid folding angles that would compromise the mechanical resistance of the conductor, so-called roller units are used, that is, a plurality of rollers disposed in an arc of a circle, which defines the equivalent geometric work arc of the roller units.

However, the geometric work arc of the roller unit above has a fixed value, therefore defined during the construction step, therefore the roller unit proves to be not very flexible with regard to the functioning and usage modes.

To at least partly resolve this problem there are also roller units which comprise an oscillating frame, also with several sliders, so as to have a possibility of varying the work geometry, depending on the loads applied and on the geometric configurations of the catenary of the conductor during the work steps.

However, the roller units with an oscillating frame have some disadvantages, for example the travel of the sliders is generally too wide, therefore the radius of curvature to which the cable is subjected can become too low, that is, since the travel of the sliders is too wide, in certain situations it can determine an equivalent or work diameter value of the roller unit which is too low and which can conflict with the size parameters of the pulley, such as for example 20 times the diameter of the conductor.

Therefore, although having an oscillating frame, even with a plurality of sliders, known roller units prove to be not very stable, improvable with regard to the possibility of being used in different situations and also the possibility of making the supported cable assume, in a precise and stable manner, different radii of curvature, so that the cables do not curve too much.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore the need to perfect a roller unit for laying cables and therefore a plant for laying cables that can overcome at least one of the disadvantages of the state of the art.

One purpose of the present invention is to provide a roller unit for laying cables which provides a limited oscillation of the sliders to support the cables and allows to make the cable assume, in a stable manner, a determinate radius of curvature, in any case guaranteeing that the radius of curvature to which the cable is subjected, be it a towing cable, a pilot cable, a conductor or other, does not fall below a predetermined value.

Another purpose of the present invention is to provide a roller unit for laying cables which allows to possibly vary the laying geometry of the cable, that is, its minimum radius of curvature, in a stable and precise manner.

Another purpose of the present invention is to provide a roller unit for laying cables which has a high degree of operating flexibility, so as to adapt to different laying situations or situations where the minimum curvature is limited, and which can also guarantee wide radii of curvature of the cable.

Another purpose of the present invention is to provide a roller unit for laying cables that has a much greater equivalent work diameter than for example a pulley with large sizes, and in any case allows to cover work intervals that can go beyond the common diameters of pulleys available on the market, which generally reach up to 1.5 m, allowing to produce even very large equivalent diameters and therefore radii of curvature, that is, equal to 3 m or more.

Another purpose of the present invention is to provide a stretching plant in which the laying of the cables occurs in an efficient manner, in which the cables can be laid in a precise manner with different radii of curvature, while guaranteeing that the radii of curvature do not fall below a determinate predetermined value.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, one purpose of the invention is a roller unit for laying cables, comprising a frame where at least one pair of sliders are positioned disposed in sequence and aligned parallel to a laying direction of cables; in which the sliders are each provided with at least one pair of wheels to support a cable to be laid; the sliders are hinged to the frame and rotatable around respective axes of rotation in order to vary the inclination thereof with respect to the frame and therefore to vary the radius of curvature of the supported cable.

According to one aspect of the invention, in the roller unit at least one of the sliders comprises at least one oscillation limiting tooth provided in at least one portion of the slider protruding from the frame; in which the oscillation limiting tooth is configured to abut against a wall of the frame when the slider, rotating around the respective axis of rotation, exceeds a certain inclination, so as to prevent an excessive reduction of the radius of curvature of the cable supported by the slider.

Advantageously, by means of the oscillation limiting tooth of which at least one slider of the present roller unit is provided, it is possible to limit the radius of curvature to which the cable to be laid is to be subjected and also to provide a stable position of said slider according to the desired inclination, which substantially represents the desired radius of curvature of the cable to be laid.

The oscillation limiting tooth can comprise a tooth that protrudes from a portion of the slider that protrudes externally from the frame and is able to abut against the wall of the frame.

The oscillation limiting tooth also allows to limit the oscillation of the slider in a precise as well as stable manner, thus allowing to avoid undesired movements of the slider and to also be able to determine precise radii of curvature to which to subject the cable to be laid.

In some embodiments, the lateral abutment wall of the oscillation limiting tooth is a front or rear wall of the frame with respect to the laying direction of the cables.

The oscillation limiting tooth can preferably be provided on both sliders and in particular on both portions of the sliders protruding externally with respect to opposite ends of the frame.

The roller unit can comprise an oscillation limiting tooth positioned on a portion of the slider disposed internally with respect to the frame.

The roller unit can comprise one or more regulation members to regulate the reciprocal distance between the frame and the oscillation limiting tooth.

The regulation members can comprise one or more shims which can be applied to the frame and/or to the oscillation limiting tooth.

The regulation members can comprise at least one regulation screw applicable to the frame and/or to the oscillation limiting tooth.

The roller unit can comprise a plurality of pairs of sliders disposed adjacent, in which each pair of the sliders is aligned parallel to a laying direction and is able to support at least one cable to be stretched.

The roller unit can comprise three, or five, pairs of aligned sliders, in which the wheels of the pair of central sliders support a towing cable and the wheels of the pairs of lateral sliders support the respective conductors being laid according to a bundle configuration.

A further purpose of the present invention is a plant for laying cables, comprising at least a winch machine and at least a braking machine positioned on opposite sides with respect to one or more intermediate supports, on which one or more roller units for laying cables as defined above are positioned.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein:

FIG. 3 is a schematic lateral view of a slider of the present roller unit having a first inclination;

FIG. 4 is a schematic lateral view of a slider of the present roller unit having a second inclination;

FIG. 5 is a schematic lateral view of a slider of the present roller unit having a third inclination;

FIG. 6 is a lateral section view of a part of a frame of the present roller unit;

FIG. 7 is a three-dimensional view of a multiple roller unit for laying cables;

FIG. 8 is a schematic front view of a part of a single roller unit for laying cables of FIG. 2;

FIG. 8a is a schematic front view of a traditional single pulley for laying cables;

FIG. 9 is a schematic front view of a part of the multiple roller unit of FIG. 7;

FIG. 9a is a schematic front view of a traditional multiple pulley for laying cables.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
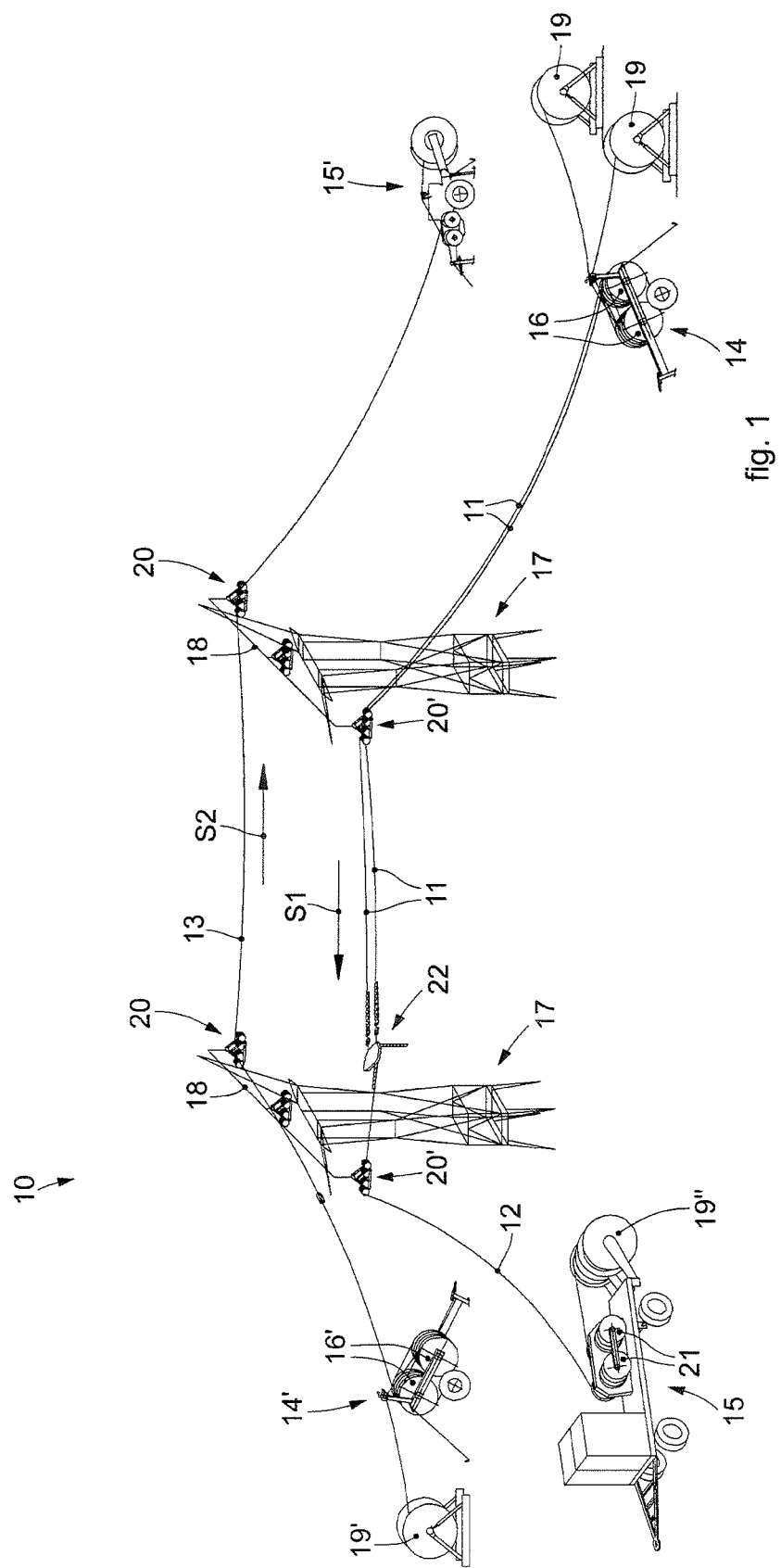
FIG. 1 is a schematic view of a plant for laying cables according to the invention.

With reference to the attached drawings, FIG. 1 shows a laying plant 10 according to the present invention, configured to lay cables 11, 12, 13, that is, for example, a pair of conductors 11, by means of, in this case, a towing cable 12, or to lay a pilot cable 13.

The laying plant 10 comprises, to lay the conductors 11, at least one braking machine 14, provided with one or more unwinding members, or capstans 16, and at least one winch machine 15.

Similarly, the laying plant 10 comprises, to lay the pilot cable 13, at least one braking machine 14', provided with one or more unwinding members, or capstans 16', and at least one winch machine 15'.

The braking machines 14, 14' and the winch machines 15, 15' could also be of the winch-brake type, that is, combined to selectively perform both the winch function and also the braking function.

The braking machines 14, 14' and the winch machines 15, 15' are positioned on opposite sides with respect to intermediate supports 17, for example pylons, on which the cables 11, 12, 13 are laid.

On the intermediate supports 17, as can be seen, the cables 11, 12, 13 are laid on a plurality of roller units 20, 20' according to the present invention.

The rollers units 20, 20' can be positioned at a certain height from the ground and are attached, preferably in a removable manner, to support elements 18 provided on said intermediate supports, for example beams, steel section bars or suchlike.

The support elements 18 can be directed transversely with respect to the laying directions S1 and S2 of the cables 11, 12, 13 and several aligned roller units 20, 20' can be positioned on them.

On the braking machine 14, the conductors 11 are fed by respective reels 19 disposed upstream of the respective pairs of capstans 16.

The winch machine 15 is also provided with corresponding capstans 21 and the towing cable 12 is wound on each of them and is then collected in a reel 19".

The towing cable 12 has its end firmly connected to a return device 22, to which the conductors 11 are connected on the opposite side, being laid in the direction S1 by the winch machine 15 and coming from the pairs of capstans 16 of the corresponding braking machine 14.

The pilot cable 13 is instead picked up from a reel 19' located upstream of the braking machine 14' and laid in the direction S2 by means of the winch machine 15'.

Figure 2:
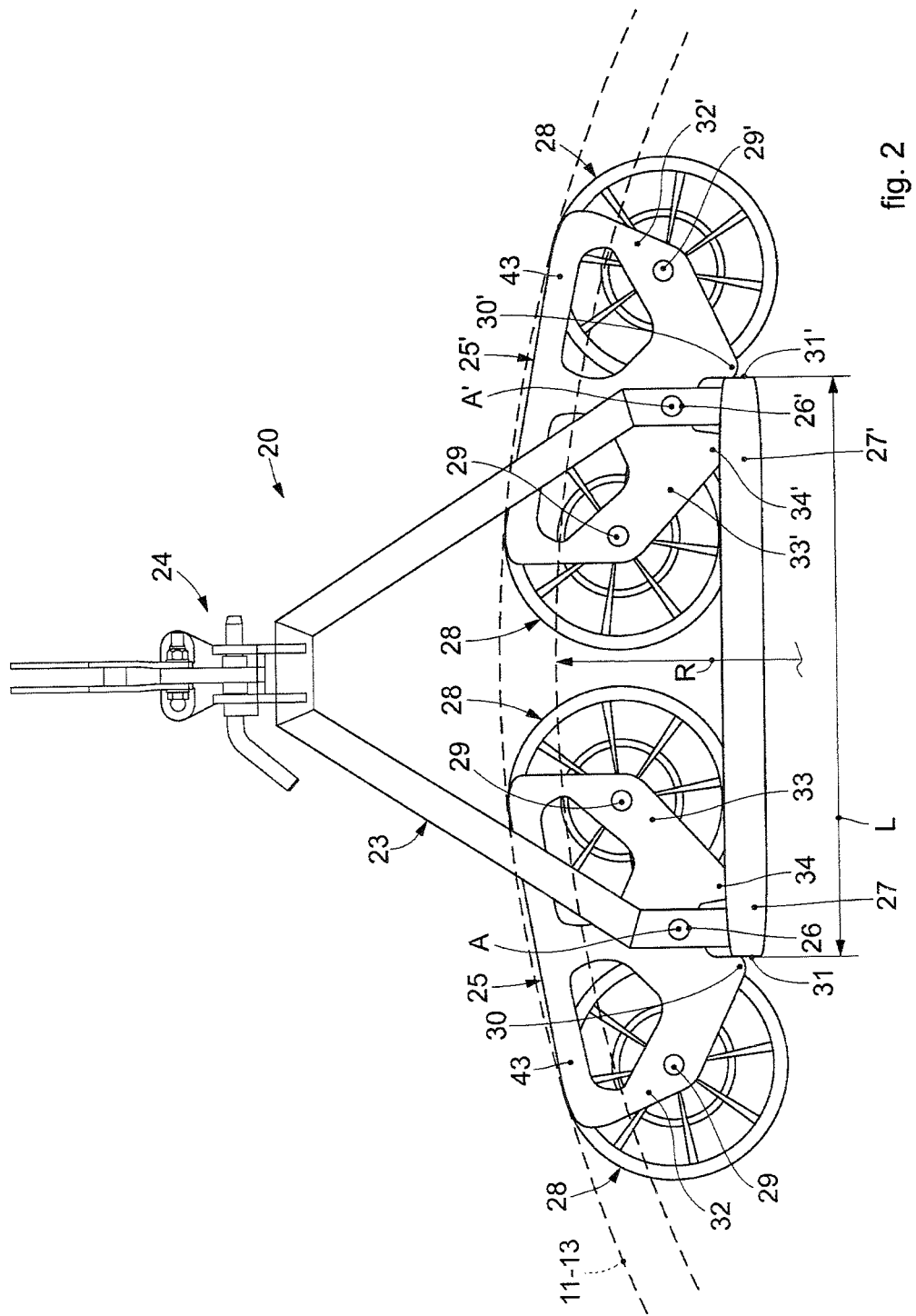
FIG. 2 is a schematic lateral view of a roller unit for laying cables according to the invention.

The roller unit 20, see in particular FIG. 2, comprises a frame 23 which can be attached, by means of suitable connection means 24, to the support element 18 positioned on the intermediate support 17.

A first slider 25 and a second slider 25' are positioned on the frame 23, in particular the sliders 25 and 25' are hinged to the frame 23 so as to define respective axes of rotation A, A', for example by means of a rotation pin 26, 26'.

The sliders 25 and 25' are disposed in sequence and aligned, for example parallel to one of the laying directions S1 or S2 and therefore able to accommodate one of the cables 11, 12, 13 in a suitable manner.

In particular, the axes of rotation A, A' of the sliders 25, 25' are positioned in proximity to opposite ends 27, 27' of the frame 23.

Each of the sliders 25, 25' is associated with at least one pair of wheels 28 on which a cable 11, 12, 13 to be laid lies, in particular idle wheels 28 hinged to the sliders 25, 25', for example by means of corresponding rotation pins 29.

The sliders 25, 25' can for example provide a pair of support frames 43, 43', see also FIG. 7, parallel and suitably shaped, between which the wheels 28 are hinged.

Each of the sliders 25, 25' is provided with an oscillation limiting tooth 30, 30' configured to limit the inclination or oscillation of each of the sliders 25, 25' with respect to the frame 23 in a stable manner, therefore so that the radius of curvature R of the cables 11, 12 13 does not fall below a predetermined value.

The oscillation limiting tooth 30, 30' protrudes from a portion 32, 32' of the slider 25, 25' positioned externally to the frame 23, so as to abut against a lateral wall 31, 31' of the frame 23, in particular a lateral wall made at the opposite ends 27, 27' of the frame 23.

The lateral wall 31, 31' can therefore be the front wall or the rear wall of the frame 23 with respect to one of the laying directions S1, S2 of the cables 11, 12, 13.

It is possible to provide that the oscillation limiting tooth 30, 30' is provided on at least one of the sliders 25, 25' of the frame 23, but preferably, it will be provided on both sliders 25, 25'.

The oscillation limiting tooth 30, 30' acts automatically if the sliders 25, 25' are inclined around the respective axes A, A' toward the outside of the frame 23 and therefore prevents the sliders 25, 25' from further rotating around the respective axes A, A', thus avoiding an unwanted decrease of the radius of curvature R, which is therefore stably maintained as shown in the drawing.

In particular, advantageously, it is also possible to provide that the oscillation limiting tooth 30, 30' has a flat end surface which, following the inclination of the slider 25, 25' abuts against the flat surface of the lateral wall 31, 31'.

The oscillation limiting tooth 30, 30', thanks to its impact against the lateral wall 31, 31' of the frame 23 of the slider 25, 25' guarantees great positioning stability of the slider 25, 25', which is therefore prevented from further oscillation movements.

The oscillation limiting tooth 30, 30', given its positioning and its protruding conformation suitable to abut against the lateral wall 31, 31' of the frame 23, also guarantees great precision in the positioning of the slider 25, 25', therefore the possibility of also obtaining high precision in the radii of curvature of the cables 11, 12, 13.

Oscillation limiting teeth 34, 34' can possibly be provided, similar to the oscillation limiting teeth 30, 30', also in portions 33, 33' of the sliders 25, 25' positioned internally to the frame 23. In this way, a limitation of the radius of curvature of the cables 11, 12, 13 is obtained, which therefore cannot assume radii of curvature that are too wide.

As a function of the position of the point of contact of the oscillation limiting teeth 30, 30' with the lateral walls 31, 31' it is also possible to vary the stable positioning of the sliders 25, 25' and therefore the radius of curvature of the cables 11, 12, 13 resting on the roller unit 20.

For example, it is possible to provide that the frame 23 has a variable extension L, see also FIG. 3, FIG. 4 and FIG. 5. The extension L of the frame 23 can be varied, from one or both ends 27, 27' of the frame 23 so as to obtain an inclination of the roller unit 20 such as to achieve different radii of curvature R1, R2 or R3.

In the example of FIG. 3, FIG. 4 and FIG. 5, the radius of curvature R1 is the smaller radius of curvature for the cable 11, 12, 13, the radius of curvature R2 is an intermediate radius of curvature, while the radius of curvature R3 is the largest radius of curvature.

It is possible to provide regulation members which vary the reciprocal distance between the frame 23 and the oscillation limiting tooth 30, 30', that is, the extension L of the frame 23 and/or the extension of the oscillation limiting tooth 30, 30'.

The extension L of the frame 23 can be varied for example by using regulation members applicable to one or both ends 27, 27' of the frame 23.

The regulation members could be for example suitable shims 39, 40, 41 of extension L1, L2 and L3 disposed at the ends 27, 27' of the frame 23 and able to be interposed between the oscillation limiting tooth 30, 30' and the lateral wall 31, 31'.

The shims 39-41 are preferably interchangeable and applied to the frame 23 in a removable manner and by means of any suitable attachment mean whatsoever.

The regulation members could also be made for example by means of a regulation screw 36 protruding from the lateral wall 31, 31' of the end 27, 27', see FIG. 6, and whose head 42 can abut against the oscillation limiting tooth 30, 30'.

As a function of a greater or lesser screwing of the regulation screw 36 with respect to the frame 23, it is possible to regulate the position of the contact point of the oscillation limiting tooth 30, 30', therefore the inclination of the sliders 25, 25' and ultimately obtain the desired radius of curvature of the cable 11, 12, 13, for example the radius of curvature R1, R2 or R3.

Other regulation members to regulate the extension E of the frame 23 can provide regulation gibs, or other mechanical devices suitable for this purpose.

As an alternative to or in combination with the above, the members to regulate the reciprocal distance between the frame 23 and the oscillation limiting teeth 30, 30' could be provided on the oscillation limiting teeth 30, 30', so it would be possible to provide regulation screws 36, shims 39-41 or other, applicable on the oscillation limiting teeth 30, 30'.

FIG. 7 shows a variant of the present roller unit 20' provided with a corresponding frame 23'. In this variant, the roller unit 20' comprises a plurality of aligned pairs of sliders 25, 25', for example three pairs of sliders 25, 25' aligned for example along the laying directions S1 or S2 of FIG. 1.

For example, it is possible to provide that the towing cable 12 be positioned along the wheels 28a of the pair of central sliders 25, 25', while the conductors 11 be positioned on the wheels 28b of the lateral pairs of sliders 25, 25'.

Between the pairs of sliders 25, 25' it is possible to provide at least one other laying wheel 35 with an earthing function, thanks to the resting of the cable 11, 12, 13 which can be achieved for example with suitable preloaded springs. Naturally, the other wheel 35 can also be provided for the roller unit 20 of FIG. 2.

Furthermore, each of the wheels 28, 28a, 28b shown is conformed so as to provide a groove 37 to support the cable and containing wings 38, see for example FIG. 8 or FIG. 9.

The present roller unit 20, 20' can advantageously allow the self-alignment of the two sliders 25, 25' according to the required configuration, and allows to minimize the effects of the passage of elements that comprise the kinematic chain of the stretching system, such as fixed or balanced returns, for example the return device 22, rotatable joints and sock joints, which have different material sections from the bundle of conductors, with elements even with much larger sizes, and therefore which affect the equilibrium situation of the suspended roller unit 20, 20'.

Furthermore, the present roller unit 20 allows to maintain the four wheels 28 of each pair of sliders 25, 25' always in contact, thanks to the self-alignment, with the cables 11, 12, 13, while the roller unit 20' with several pairs of multiple adjacent sliders 25, 25' behaves in fact like a pulley, where the contact angle, and therefore the number of wheels 28a, 28b in contact with the cables 11, 12, 13, can vary as a function of the geometric configuration of the conductor itself in the span.

Another considerable advantage of the present roller unit 20, 20' is that the weights are contained to much smaller to values compared with a pulley of equivalent diameter, see for example the simple pulley 44 of FIG. 8a, or the multiple pulley 44' of FIG. 9a.

The rollers 20 and 20', if compared respectively with the pulleys 44 and 44', have smaller weights and bulks, greater logistic ease of movement and assembly, but also and above all a position of the center of gravity B1, B1' much closer to the cable 11, 12, 13 laid and stretched with respect to the centers of gravity B2, B2' of the traditional pulleys 44, 44'.

The roller unit 20, 20' according to the invention is also very advantageous when laying HTLS (High Temperature Low Sag) conductors, that is, the latest generation conductors suitable to work at much higher temperatures than a traditional ACSR conductor (from 80° C. to 150-220° C.) with the same sag, that is, when loaded. These conductors are characterized by cores made of unconventional materials (composites, invar steel or other) and layers of conductor characterized by annealed aluminum, therefore very pure and very conductive, or non-conventional aluminum alloys, such as aluminum-zirconium, characterized by very low surface hardness, and therefore extreme ease of damage compared to traditional conductors. Any method or device that minimizes the stresses on the conductor and therefore allows its integrity to be preserved is therefore indispensable, and the present roller units 20, 20' advantageously and effectively adapt to the characteristics of these conductors.

HTLS conductors are also characterized by higher winding ratios compared to a traditional conductor, going from the traditional value of 20 to 24, 28, 30 or even more in determinate cases, therefore, with the diameter of the conductor remaining equal, it would be necessary to have pulleys with a diameter not available on the market, or that could be produced only with unacceptable weights, sizes and costs.

Therefore, the present roller units 20, 20' prove to be very advantageous also for use in laying HTLS conductors, since, among others reasons, they allow to achieve high radii of curvature even with limited bulks and weights.

It is clear that modifications and/or additions of parts may be made to the roller unit for laying cables as described heretofore, without departing from the field and scope of the present invention.

It is also clear that, although the present invention has been described with reference to some specific examples, a person of skill in the art shall certainly be able to achieve many other equivalent forms of roller unit for laying cables, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A roller unit for laying cables (11, 12, 13), comprising a frame (23, 23') where at least one pair of sliders (25, 25') are positioned disposed in sequence and aligned parallel to a laying direction (S1, S2) of the cables (11, 12, 13), in which said sliders (25, 25') are each provided with at least one pair of wheels (28, 28a, 28b) to support a cable (11, 12, 13) to be laid and in which said sliders (25, 25') are hinged to said frame (23, 23') and rotatable around respective axes of rotation (A, A') in order to vary the inclination thereof with respect to said frame (23, 23') and therefore to vary the radius of curvature (R, R1, R2, R3) of the supported cable (11, 12, 13), said roller unit being characterized in that at least one of the sliders (25, 25') comprises an oscillation limiting tooth (30, 30') provided in at least one portion (32, 32') of the slider (25, 25') protruding from said frame (23, 23'), in which said oscillation limiting tooth (30, 30') is configured to abut against a lateral wall (31, 31') of said frame (23, 23') when said slider (25, 25'), rotating around the respective axis of rotation (A, A'), exceeds a certain inclination, so as to prevent an excessive reduction of the radius of curvature (R, R1, R2, R3) of the cable (11, 12, 13) supported by said slider (25, 25'), wherein said lateral wall (31, 31') on which the oscillation limiting tooth (30, 30') abuts is a front or rear wall of said frame (23, 23') with respect to said laying direction (S1, S2) of the cables (11, 12, 13).

2. The roller unit as in claim 1, characterized in that said oscillation limiting tooth (30, 30') is provided on both sliders (25, 25') and in particular on both portions (32, 32') of the sliders (25, 25') protruding externally with respect to opposite ends (27, 27') of said frame (23, 23').

3. The roller unit as in claim 1, characterized in that it comprises another oscillation limiting tooth (34, 34') positioned on a portion (33, 33') of the slider (25, 25') disposed internally with respect to said frame (23, 23').

4. The roller unit as in claim 1, characterized in that it comprises one or more regulation members (39, 40, 41, 36) to regulate the reciprocal distance between said frame (23, 23') and said oscillation limiting tooth (30, 30').

5. The roller unit as in claim 4, characterized in that said regulation members (39, 40, 41, 36) comprise one or more shims (39, 40, 41) which can be applied to said frame (23, 23') and/or to said oscillation limiting tooth (30, 30').

6. The roller unit as in claim 4, characterized in that said regulation members (39, 40, 41, 36) comprise at least one regulation screw (36) which can be applied to said frame (23, 23') and/or to said oscillation limiting tooth (30, 30').

7. The roller unit as in claim 1, characterized in that it comprises a plurality of pairs of sliders (25, 25') disposed adjacent, wherein each pair of said sliders (25, 25') is aligned parallel to a laying direction (S1, S2) and is able to support at least one cable (11, 12, 13) to be stretched.

8. The roller unit as in claim 7, characterized in that it comprises three or five pairs of aligned sliders (25, 25'), wherein the wheels (28a) provided with central sliders (25, 25') support a towing cable (12) and the wheels (28b) of the pairs of lateral sliders (25, 25') support respective conductors (11).

9. A plant for laying cables, comprising at least a winch machine (15, 15') and at least a braking machine (14, 14') positioned on opposite sides with respect to one or more intermediate supports (17), on which one or more roller units (20, 20') for laying cables as in claim 1 are positioned.

* * * * *